(12) United States Patent
Funahashi

(10) Patent No.: US 6,304,727 B1
(45) Date of Patent: Oct. 16, 2001

(54) VIEWFINDER AND CAMERA HAVING A VIEWFINDER

(75) Inventor: Akira Funahashi, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/404,591

(22) Filed: Sep. 24, 1999

(30) Foreign Application Priority Data

Sep. 25, 1998 (JP) .................................................. 10-271114

(51) Int. Cl.⁷ .................................................. G03B 13/10
(52) U.S. Cl. .................................................. 396/84; 396/379
(58) Field of Search .................................................. 396/84, 379

(56) References Cited

U.S. PATENT DOCUMENTS 4,944,030   7/1990   Haraguchi et al. .............. 396/377 X
5,655,159 * 8/1997   Nakayama et al. .................... 396/84

FOREIGN PATENT DOCUMENTS 10177198   6/1998   (JP) .

* cited by examiner

Primary Examiner—W. B. Perkey
(74) Attorney, Agent, or Firm—McDermott, Will & Emery

(57) ABSTRACT

In a viewfinder having objective lens elements G1 to G4 and performing zooming by driving the objective lens elements G2 and G3 in the direction of the optical axis x, a finder cam 6 is provided that interlocks with an axially movable barrel 9 through a pin 9a and drives the objective lens elements G2 and G3 through cam followers 4 and 8 and lens frames 5 and 7, respectively.

22 Claims, 6 Drawing Sheets

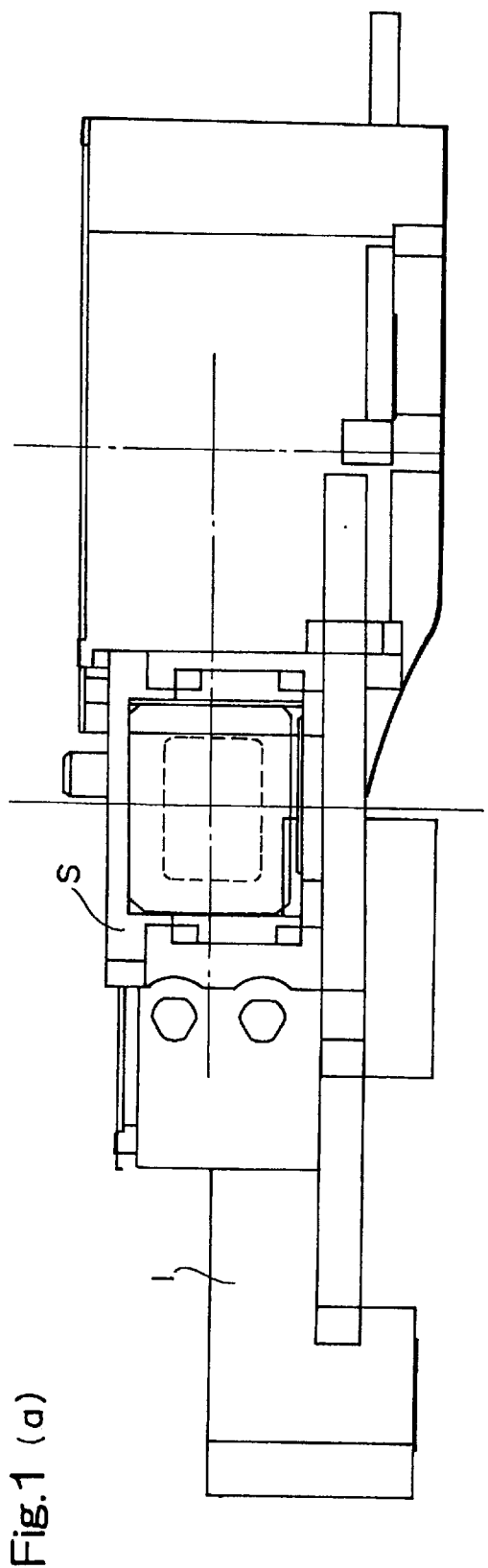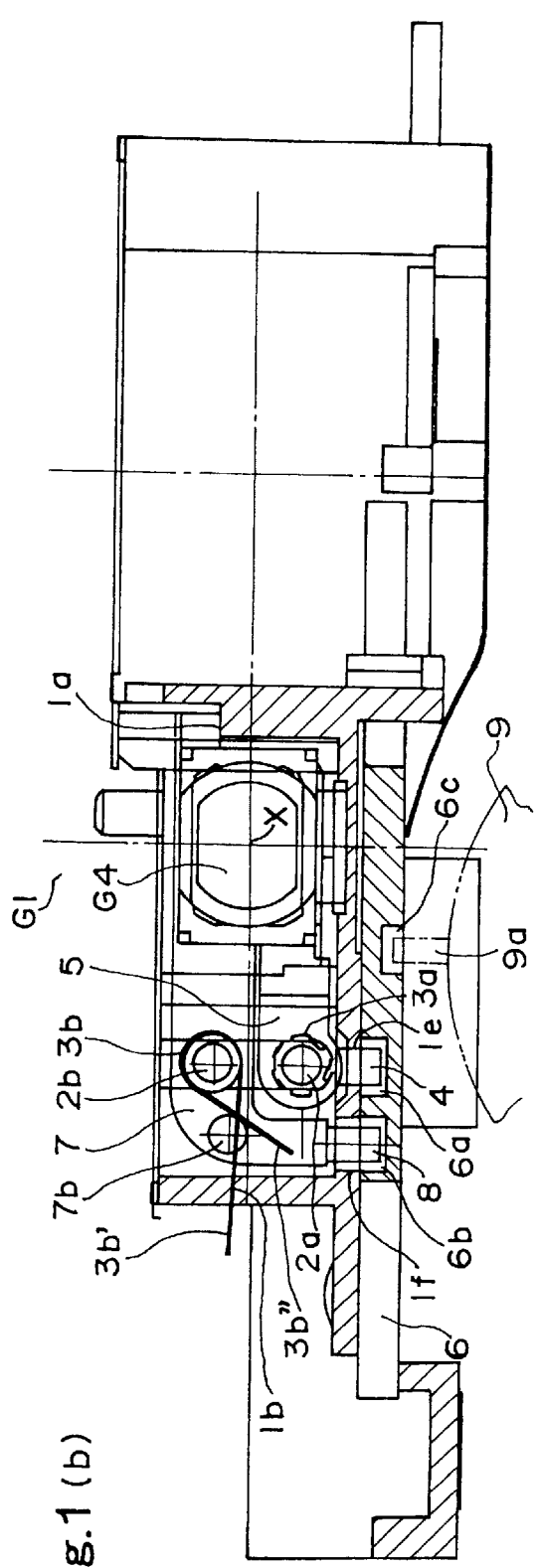
Fig.1 (a)
Fig.1 (b)

VIEWFINDER AND CAMERA HAVING A VIEWFINDER

This application is based on application No. Hei 10-271114 filed in Japan, the content of which is hereby incorporated by reference.

BACKGROUND OF THE INVENTION

1. Field of the Invention

The present invention relates to a viewfinder having a zooming function. The present invention also relates to a camera having such viewfinder.

2. Description of the Prior Art

In many conventional cameras capable of zooming, the cam for zooming held on the finder unit is driven by being interlocked with a zoom drive system in the lens barrel of the taking lens or the lens barrel itself by use of gears or the like. In recent years, a camera has been put on the market in which zooming of the viewfinder is performed by driving the zoom cam held on the lens barrel of the taking lens by interlocking it with an axially movable barrel of the lens barrel.

However, the former structure is disadvantageous in cost and size reduction of the camera because a mechanical member for the interlocking such as a gear is necessary. In addition, a deviation is caused between the zooming of the lens barrel of the taking lens and the zooming of the viewfinder because of a backlash in the mechanical member, so that the magnification of the viewfinder deviates for the actually taken image.

In the latter structure in which the zooming of the viewfinder is carried out by the zoom cam on the taking lens barrel, since the accuracy of the lens units of the viewfinder are dependent on the assembly condition other than the viewfinder, the error of the relative position becomes large, and this incurs degrading of the performance. Since the zoom cam is not integrated in the finder unit until the finder unit is combined with the taking lens barrel, it is impossible to confirm the function and performance of the finder unit alone during camera manufacturing. In addition, since the cam follower for the zoom cam to be provided on the finder unit is mounted when the entire camera is assembled, the assembly is difficult.

SUMMARY OF THE INVENTION

In view of the above-described problem, an object of the present invention is to provide a low-cost and space-saving viewfinder in which the deviation between the zooming of the lens barrel of the taking lens and the zooming of the viewfinder is small, the assembly is easy and the function and the performance can easily be guaranteed.

Another object of the present invention is to provide a camera having such viewfinder.

To achieve the above-mentioned object, according to one aspect of the present invention, in a viewfinder comprising a plurality of lens units and performing zooming by driving at least one of the plurality of lens units in a direction of an optical axis, a finder unit for holding the plurality of lens units has a cam driven by a member integrally driven with a lens barrel member so as to drive the lens unit in the direction of the optical axis.

The lens barrel member is an axially movable barrel in the lens barrel of the taking lens. The cam is a flat shaped cam plate.

The cam has on one surface a groove-form bottomed cam for driving the lens unit and has on the other surface a groove-form bottomed cam for interlocking with the lens barrel member.

An opening is provided for engaging the cam with the driven lens unit. The opening is always covered with the cam in a drive region where zooming is performed.

A stationary barrel surrounding the lens barrel member is provided in the lens barrel of the taking lens. The stationary barrel has an opening for engaging the cam with the lens barrel member. The opening is always covered with the cam in the drive region where zooming is performed.

These and other objects, advantages and features of the invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

FIGS. 1(a) and 1(b) are front views of a viewfinder according to an embodiment of the present invention;

DETAILED DESCRIPTION OF THE PREFERRED EMBODIMENTS

Figure 2:
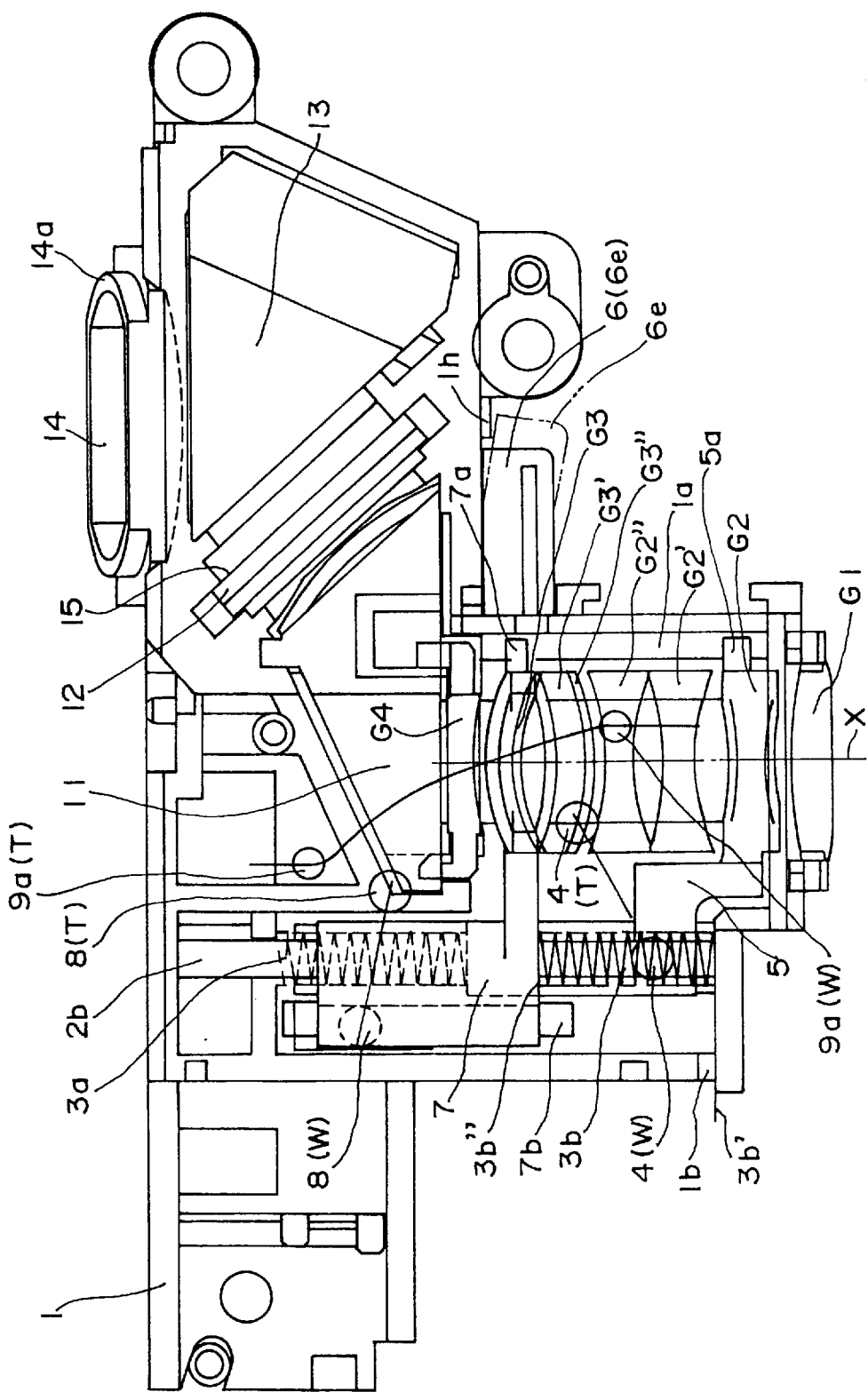
FIG. 2 is a top plan view of the viewfinder of the embodiment in which a cover sheet is removed.
Figure 3:
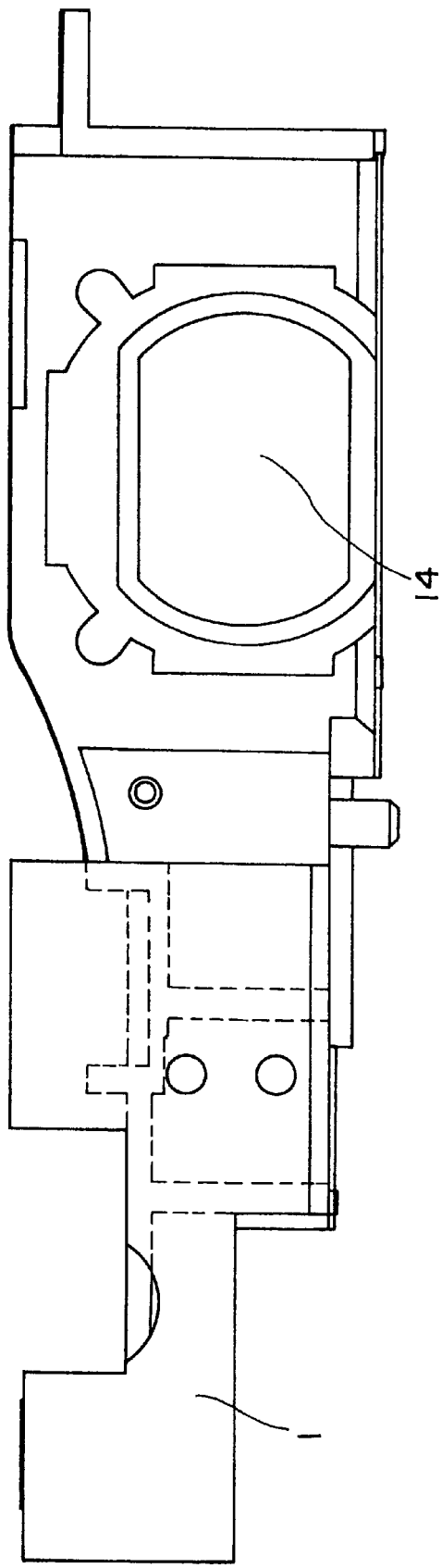
FIG. 3 is a rear view of the viewfinder of the embodiment.

Hereinafter, an embodiment of the present invention will be described with reference to the drawings. FIGS. 1 to 4 show a structure of the viewfinder.

As shown in the figures, the finder optical system of this embodiment comprises, from the objective side, objective lens elements G1, G2, G3 and G4, a substantially trapezoidal objective prism 11, a finder LCD (Liquid Crystal Display) 12, a substantially triangular eyepiece prism 13 and an eyepiece lens 14.

A finder mount 1 constitutes a frame for the entire viewfinder in this embodiment. The objective lens element G1 is bonded and fixed to the finder mount 1 with a first diaphragm S in between. The objective lens elements G2 and G3 move in the direction of the optical axis x of this optical system to perform zooming. Details will be given later. The objective lens element G4 is positioned and bonded to the objective prism 11 with a non-illustrated second diaphragm in between. The objective prism 11 is fitted in the finder mount 1.

The finder LCD 12 is bonded to a view field frame 15. The view field frame 15 is fitted in the finder mount 1. The eyepiece prism 13 is fitted in the finder mount 1. The eyepiece lens 14 is bonded and fixed to the finder mount 1.

Figure 6:
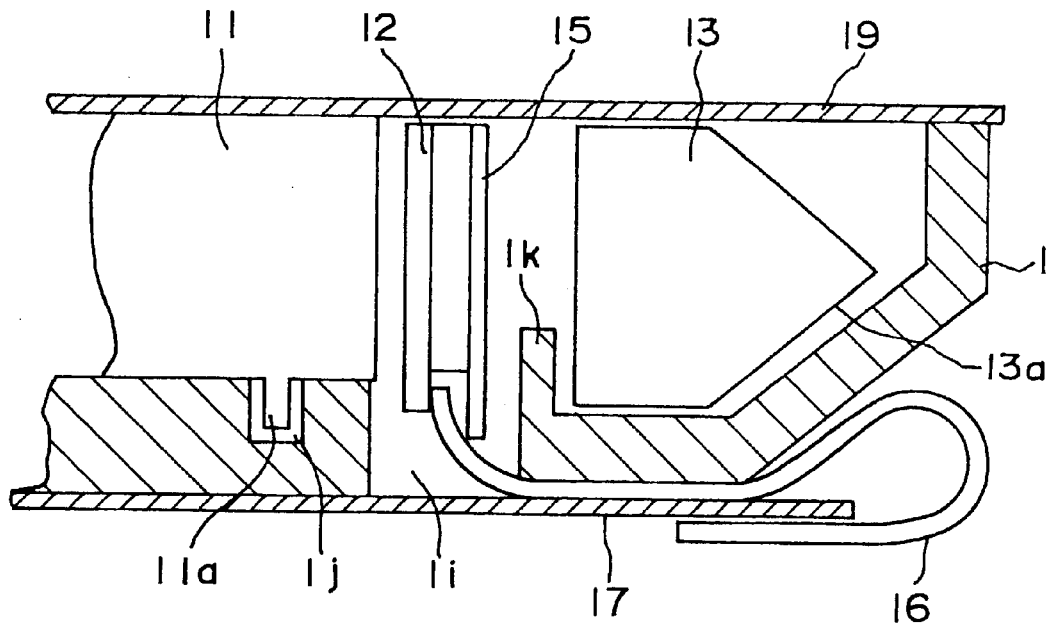
FIG. 6 is a longitudinal cross-sectional view of a prism portion showing a holding condition of a flexible circuit board.

As shown in the longitudinal cross-sectional view of FIG. 6 showing the prism portion, the objective prism 11a is provided with a prism rib 11a in the vicinity of the image plane, and a mount concave portion 1j is provided in the finder mount 1 in a position corresponding to the position of the prism rib 11a. This prevents dust entering the objective system from outside from reaching the image plane. Between the eyepiece prism 13 and the image plane, a mount rib 1k protrudes from the finder mount 1. This prevents the dust at the eyepiece prism 13 from reaching the image plane.

Figure 7:
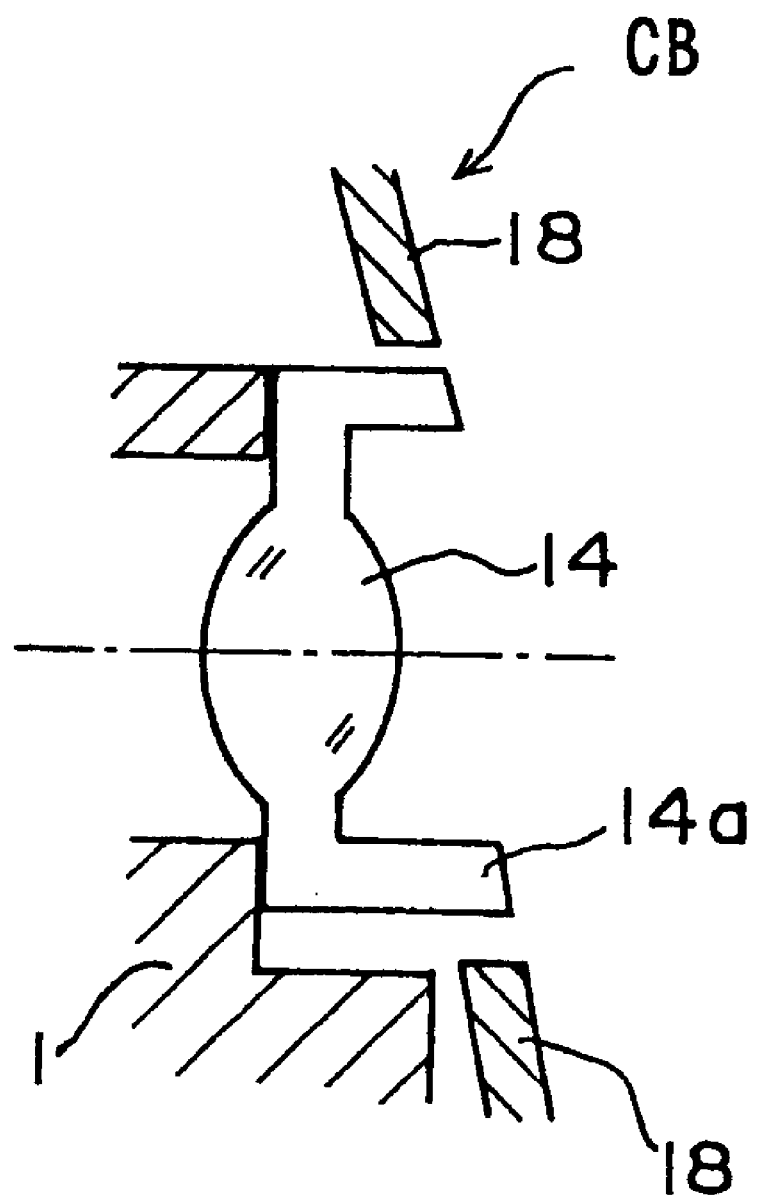
FIG. 7 is a longitudinal cross-sectional view of an eyepiece lens and the structure therearound.

As shown in FIG. 2 and in longitudinal cross-sectional view of FIG. 7 showing the eyepiece lens 14 and the structure therearound, a rib 14a is provided on the periphery of the eyepiece lens 14 fixed to the finder mount 1. The outer surface of the rim 14a is flush with the exterior 18 of the camera body CB shown in FIG. 7. With this structure, when the eyepiece lens 14 is disposed in the vicinity of the exterior 18, assembly can be performed without the lens surface being scratched, and an excellent appearance can be maintained.

In FIG. 2, the objective lens element G2 integrally formed with a lens frame 5 is held so as to be axially slidable along a finder guide shaft 2a provided in the finder amount 1. The finder guide shaft 2a is disposed along a subsequently-described finder guide shaft 2b slidably holding the objective lens element G3 and below the finder guide shaft 2b, and which is shown in FIG. 1(b). The lens frame 5 is pushed forward (toward the objective side of the figure) by a G2 pushing spring 3a, shown by the broken line, wound around the finder guide shaft 2a by a so-called compression coil spring action. A cam follower 4 protrudes from the bottom surface of the lens frame 5.

FIG. 1(a) is a front exterior view. FIG. 1(b) is a font cross-sectional view. As shown in FIG. 1(b), the cam follower 4 protruding from the bottom surface of the lens frame 5 passes through an opening le provided at the bottom of the finder mount 1, engages with a G2 cam 6a which is a groove-form bottomed cam provided in the top surface of a finder cam 6 which is a flat plate cam provided therebelow, and is positioned following the operation of the finder cam 6, that is, the operation of the G2 cam 6a.

The opening le is always covered with the finder cam 6 in the drive region where zooming is performed. This prevents light from leaking from the inside of the finder to the inside of the camera body. In the figure, the finder guide axis 2a and the G2 pushing spring 3a are shown in a condition viewed from the axial direction. Likewise, the direction of the optical axis x is vertical to the plane of the figure.

Figure 4:
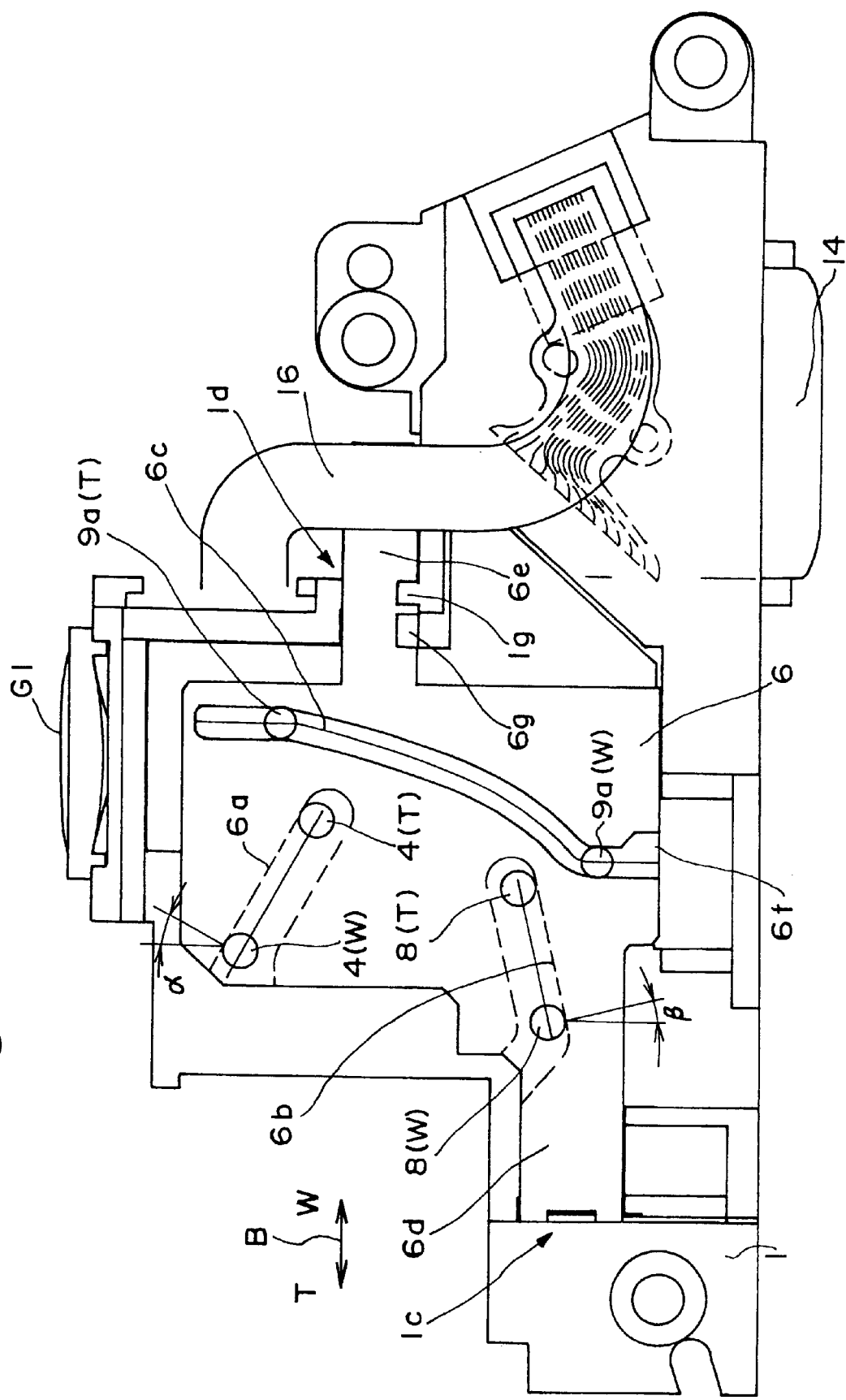
FIG. 4 is a bottom view of the viewfinder of the embodiment.

FIG. 4 shows the finder cam 6 viewed from below. As shown in the figure, the cam follower 4 always abuts on a side surface of the straight-groove-form G2 cam 6a, shown by the broken line, provided in the top surface of the finder cam 6. This is by a forward (toward the objective side) pressure from the G2 pushing spring 3a. The pressure has a certain pressure angle as shown by α in the figure. By this, moment of a force being always in a clockwise direction viewed from the objective side acts on the lens frame 5 around the finder guide shaft 2a (see FIG. 1). By an abutting portion 5a of the lens frame 5 shown in FIG. 2 abutting on a guide surface 1a of the finder mount 1 shown in FIGS. 1 and 2, the lens frame 5 is prevented from rotating.

Likewise, as shown in FIG. 2, the objective lens element G3 integrally formed with a lens frame 7 is held so as to be axially slidable along the finder guide shaft 2b provided in the finder mount 1. The lens frame 7 is pushed backward (toward the eyepiece side) by a G3 pushing spring 3b wound around the finder guide shaft 2b by a so-called compression coil spring action. A cam follower 8 protrudes from the bottom surface of the lens frame 7.

As shown in FIG. 1(b), the cam follower 8 protruding from the bottom surface of the lens frame 7 passes through an opening 1f provided at the bottom of the finder mount 1, engages with a G3 cam 6b which is a groove-form bottomed cam provided in the top surface of the finder cam 6 which is a flat plate cam provided therebelow, and is positioned following the operation of the finder cam 6, that is, the operation of the G3 cam 6b. The opening 1f is always covered with the finder cam 6 in the drive region where zooming is performed. This prevents light from leaking from the inside of the finder to the inside of the camera body. In the figure, the finder guide axis 2b and the G3 pushing spring 3b are shown in a condition viewed from the axial direction.

As shown in FIG. 4, the cam follower 8 always abuts on a side surface of the straight-groove-form G3 cam 6b, shown by the broken line, provided in the finder cam 6. This is by a backward (toward the eyepiece side) pressure from the G3 pushing spring 3b. The pressure has a certain pressure angle as shown by β in the figure. By this, moment of a force being always in a clockwise direction viewed from the objective side acts on the lens frame 5 around the finder guide shaft 2b (see FIG. 1(b)). By an abutting portion 7a of the lens frame 7 shown in FIG. 2 abutting on the guide surface 1a of the finder mount 1 shown in FIGs. 1(b) and 2, the lens frame 7 is prevented from rotating.

In this case, however, the pressure angle β of the cam follower 8 is relatively small compared to the pressure angle α of the cam follower 4, and the generated moment of the force is small. Therefore, to compensate therefor, arms 3b' and 3b" are provided at the ends of the G3 pushing spring 3b as shown in FIGS. 1)b) and 2 so that the spring 3b also acts as a so-called torsion coil spring, and the arms are engaged with the guide surface 1b of the finder mount 1 and a protrusion 7b on a side surface of the lens frame 7, whereby the generation of the above-mentioned moment of the force is ensured.

Figure 5:
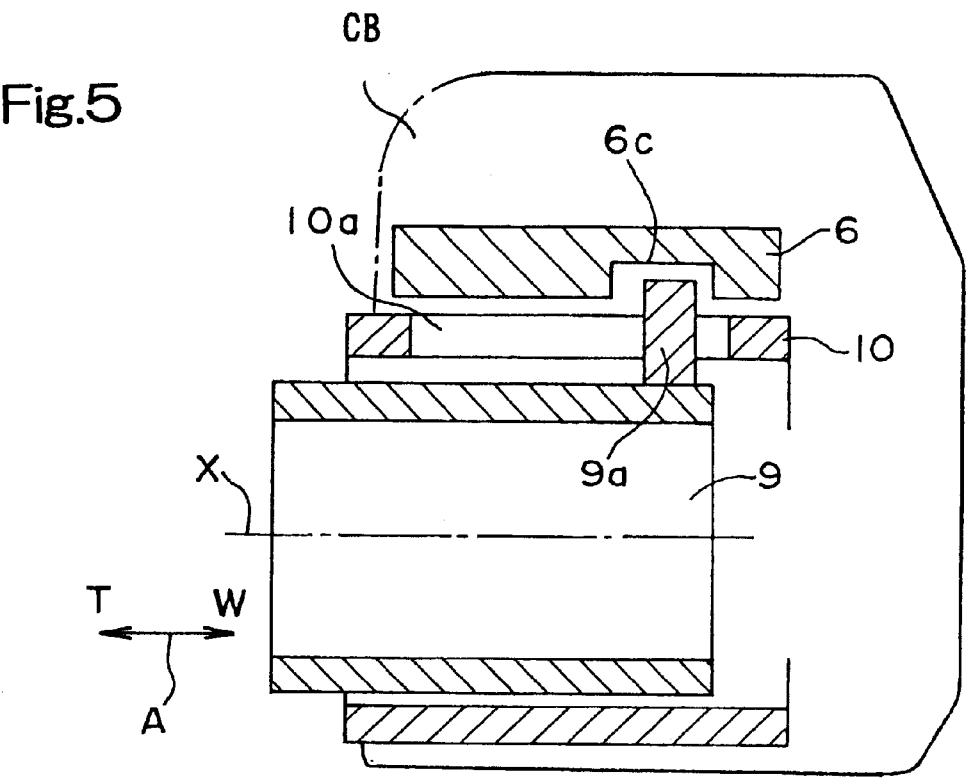
FIG. 5 is a side longitudinal cross-sectional view of a lens barrel of a taking lens of the embodiment.

As shown in FIG. 1(b), the finder cam 6 has in its bottom surface a drive cam 6c which is a groove-form bottomed cam. A pin 9a protruding from the top of an axial movable barrel 9 schematically shown by the chain double-dashed line engages with the drive cam 6c. The axial movable barrel 9 constitutes a part of the lens barrel of the taking lens provided in the camera body CB, and is surrounded by a stationary barrel 10 also constituting a part of the lens barrel of the taking lens as shown in the side longitudinal cross-sectional view of FIG. 5. While the pin 9a passing through an elongate hole 10a as an opening provided at the top of the stationary barrel 10, the axial movable barrel 9 moves along the elongate hole 10a in the direction of the optical axis X from the shortest focal length condition (W) to the longest focal length condition (T) in zooming as shown by the arrow A.

When the pin 9a makes this movement, a drive force is transmitted from the pin 9a to the drive cam 6c, so that the finder cam 6 is driven. The elongate hole 10a is always covered with the finder cam 6 in the drive region where zooming is performed. This prevents the light from outside from leaking into the lens barrel.

A portion corresponding to a collapse region is present on the side, opposite to the telephoto side, of the position of the shortest focal length condition. This portion is called a mounting wide portion 6f. The mounting wide portion 6f has a large width so that it can easily be engaged with the pin 9a of the axial movable barrel 9 when the finder unit is mounted in the camera body or taking lens barrel (see FIG. 4).

Then, as shown in FIG. 4, as the pin 9a of the axially movable barrel 9 relatively moves from the position of the shortest focal length condition shown at 9a(W) to the position of the longest focal length condition shown at 9a(T), the finder cam 6 is laterally driven from the position of the shortest focal length condition (W) to the position of the longest focal length condition (T) as shown by the arrow B by the curved-groove-form drive cam 6c thereof. Arms 6d and 6e extending leftward and rightward are guided by guide portions 1c and 1d of the finder mount 1, whereby the finder cam 6 is rectilinearly guided so as to be slidable leftward and rightward.

When the finder cam 6 is mounted in the finder mount 1, a cam mounting concave portion 6g of the finder cam 6 shown in the figure is engaged with a cam holding convex portion 1g of the finder mount 1, and the finder cam 6 is mounted from above the plane of the figure. By moving the finder cam 6 from this condition in the telephoto direction, the arms 6d and 6e of the finder cam 6 are guided by the guide portions 1c and 1d and the cam holding convex portion g.

When the finder cam 6 is mounted, as shown in FIG. 2, it is mounted with the arm 6e thereof being slightly bent as shown by the broken line so as to avoid a cam separation preventing protrusion 1h on the finder mount 1, and is slid in the telephoto direction, whereby a normal condition is obtained. Even if it is tried to return the finder cam 6 from that condition to the mounting position, since the end of the arm 6e abuts on the cam separation preventing protrusion lh, the finder cam 6 can be prevented from inadvertently separating. As shown in FIG. 4, the longest focal length condition of the drive cam 6c is elongated so that a certain allowance is made, so that even when the movement range of the pin 9a increases due to an error, an immoderate force is not exerted.

When the finder cam 6 is driven, the cam followers 4 and 8 relatively move from the positions of the shortest focal length condition shown at 4(W) and 8(W) in the figure to the positions of the longest focal length condition shown at 4(T) and 8(T) with respect to the G2 cam 6a and the G3 cam 6b. At this time, as shown in FIG. 2, the objective lens element G2 is driven to positions shown at G2' and G2" in the direction of the optical axis x, and the objective lens element G3 is driven to positions as shown at G3' and G3" in the direction of the optical axis x, whereby zooming of the finder is achieved. The relationship among the positions of the shortest focal length condition and the longest focal length condition of the cam followers 4 and 8 and the pin 9a is also shown in FIG. 2.

In FIG. 4, reference numeral 16 represents a flexible circuit board for establishing electrical connection between the finder LCD 12 and the camera body. AS shown in FIGS. 4 and 6, the flexible circuit board 16 extending from the finder LCD 12 is bent so as to skirt along the finder mount 1 and a pressing sheet 17 is pasted from therebelow, whereby the flexible circuit board 16 is fixed and an opening 1i of the finder mount 1 is closed to prevent dust from reaching the image plane. By effectively using a roof part 13a of the eyepiece prism 13, the flexible cuicuit board 16 is bent back. Reference numeral 19 represents a cover sheet. The above-mentioned zooming positions in the figures are illustrated with the shortest focal length condition (W) as the reference.

As described above, according to the embodiment, a low-cost and space-saving viewfinder capable of zooming can be provided in which the deviation between the lens barrel of the taking lens and the viewfinder is small, the assembly is easy and the function and the performance can easily be guaranteed.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. In a viewfinder having a plurality of lens units and performing zooming by driving at least one of the plurality of lens units in a direction of an optical axis, said viewfinder comprising:

a holder for holding said at least one of the lens units; and a finder cam member for being engaged with and driven by a part of a lens barrel member of a taking lens so as to drive said holder in the direction of the optical axis.

2. The viewfinder according to claim 1, wherein said lens barrel member is an axially movable barrel of the taking lens.

3. The viewfinder according to claim 1, wherein said finder cam member is a flat plate.

4. The viewfinder according to claim 3, wherein said finder cam member has on one surface a groove-form bottomed cam for driving said holder, and has on the other surface a groove-form bottomed cam for engaging with the part of the lens barrel member.

5. The viewfinder according to claim 1, wherein said finder cam member is engaged with the part of the lens barrel member via an opening, and the opening is covered with said finder cam member in a drive region where zooming is performed.

6. A camera having a taking lens having a lens barrel member which is moved for zooming;

a viewfinder having a plurality of lens units and performing zooming by driving at least one of the plurality of lens units in a direction of an optical axis; and a finder cam member provided in said viewfinder for being engaged with and driven by a part of the lens barrel member of the taking lens so as to drive said at least one of the lens units in the direction of the optical axis.

7. The camera according to claim 6, wherein said lens barrel member is an axially movable barrel.

8. The camera according to claim 6, wherein said finder cam member is a flat plate.

9. The camera according to claim 8, wherein said finder cam member has on one surface a groove-form bottomed cam for driving said at least one of the lens units, and has on the other surface a groove-form bottomed cam for engaging with the part of the lens barrel member.

10. The camera according to claim 6, wherein said finder cam member is engaged with the part of the lens barrel member via an opening, and the opening is covered with said finder cam member in a drive region where zooming is performed.

11. The camera according to claim 6, further comprising a stationary barrel surrounding said lens barrel member, said stationary barrel has an opening for engaging said finder cam member with the lens barrel member, and the opening is covered with said finder cam member in the drive region where zooming is performed.

12. In a viewfinder having a plurality of lens units and performing zooming by driving at least one of the plurality of lens units in a direction of an optical axis, said viewfinder comprising:

a holder for holding said at least one of the lens units; and a finder cam member for being engaged with and driven by a member integrally fixed to a lens barrel member of a taking lens so as to drive said holder in the direction of the optical axis.

13. The viewfinder according to claim 12, wherein said lens barrel member is an axially movable barrel of the taking lens.

14. The viewfinder according to claim 12, wherein said finder cam member is a flat plate.

15. The viewfinder according to claim 14, wherein said finder cam member has on one surface a groove-form bottomed cam for driving said holder, and has on the other surface a groove-form bottomed cam for engaging with the lens barrel member.

16. The viewfinder according to claim 12, wherein said finder cam member is engaged with the lens barrel member via an opening, and the opening is covered with said finder cam member in a drive region where zooming is performed.

17. A camera having a taking lens having a lens barrel member which is moved for zooming;

a viewfinder having a plurality of lens units and performing zooming by driving at least one of the plurality of lens units in a direction of an optical axis; and a finder cam member provided in said viewfinder for being engaged with and driven by a member integrally fixed to the lens barrel member of the taking lens so as to drive said at least one of the lens units in the direction of the optical axis.

18. The camera according to claim 17, wherein said lens barrel member is an axially movable barrel.

19. The camera according to claim 17, wherein said finder cam member is a flat plate.

20. The camera according to claim 19, wherein said finder cam member has on one surface a groove-form bottomed cam for driving said at least one of the lens units, and has on the other surface a groove-form bottomed cam for engaging with the lens barrel member.

21. The camera according to claim 19, wherein said finder cam member is engaged with the lens barrel member via an opening, and the opening is covered with said finder cam member in a drive region where zooming is performed.

22. The camera according to claim 17, further comprising a stationary barrel surrounding said lens barrel member, said stationary barrel has an opening for engaging said finder cam member with the lens barrel member, and the opening is covered with said finder cam member in the drive region where zooming is performed.

* * * * *